United States Patent [19]

Evans et al.

[11] 3,886,307

[45] May 27, 1975

[54] ON-OFF SYSTEM FOR TELEVISION RECEIVERS

[75] Inventors: Wayne Wheeler Evans, Carmel; Don Edward Christensen, Indianapolis, both of Ind.

[73] Assignee: RCA Corporation, New York, N.Y.

[22] Filed: Feb. 11, 1974

[21] Appl. No.: 441,487

[52] U.S. Cl. ............ 178/7.3 R; 178/DIG. 11; 334/7
[51] Int. Cl. ............................................ H04n 5/44
[58] Field of Search.. 178/7, 3 R, DIG. 11, DIG. 15; 325/464, 422, 465, 459–462, 492, 470, 468; 334/1, 7, 15, 29, 89

[56] References Cited

UNITED STATES PATENTS 3,503,018 3/1970 Cavanagh ............................ 334/15
3,568,112 3/1971 Thomas .................................. 334/7
3,845,428 10/1974 Wada et al............................. 334/7

*Primary Examiner*—Robert L. Griffin
*Assistant Examiner*—John C. Martin
*Attorney, Agent, or Firm*—Eugene M. Whitacre; Stephan Siegel

[57] ABSTRACT

A television receiver having push buttons numerically labelled 0 through 9 for operatively selecting a television channel is switched on or off without the aid of a particularized manual on-off switch. Depression of channel selection push buttons activates the power to the main portion of the television receiver concurrently setting it to a desired television channel. Further depression of the push buttons selecting a particular number which does not correspond to any existent channel operatively switches the main portion of the television receiver off.

17 Claims, 1 Drawing Figure

ON-OFF SYSTEM FOR TELEVISION RECEIVERS

Figure 1:
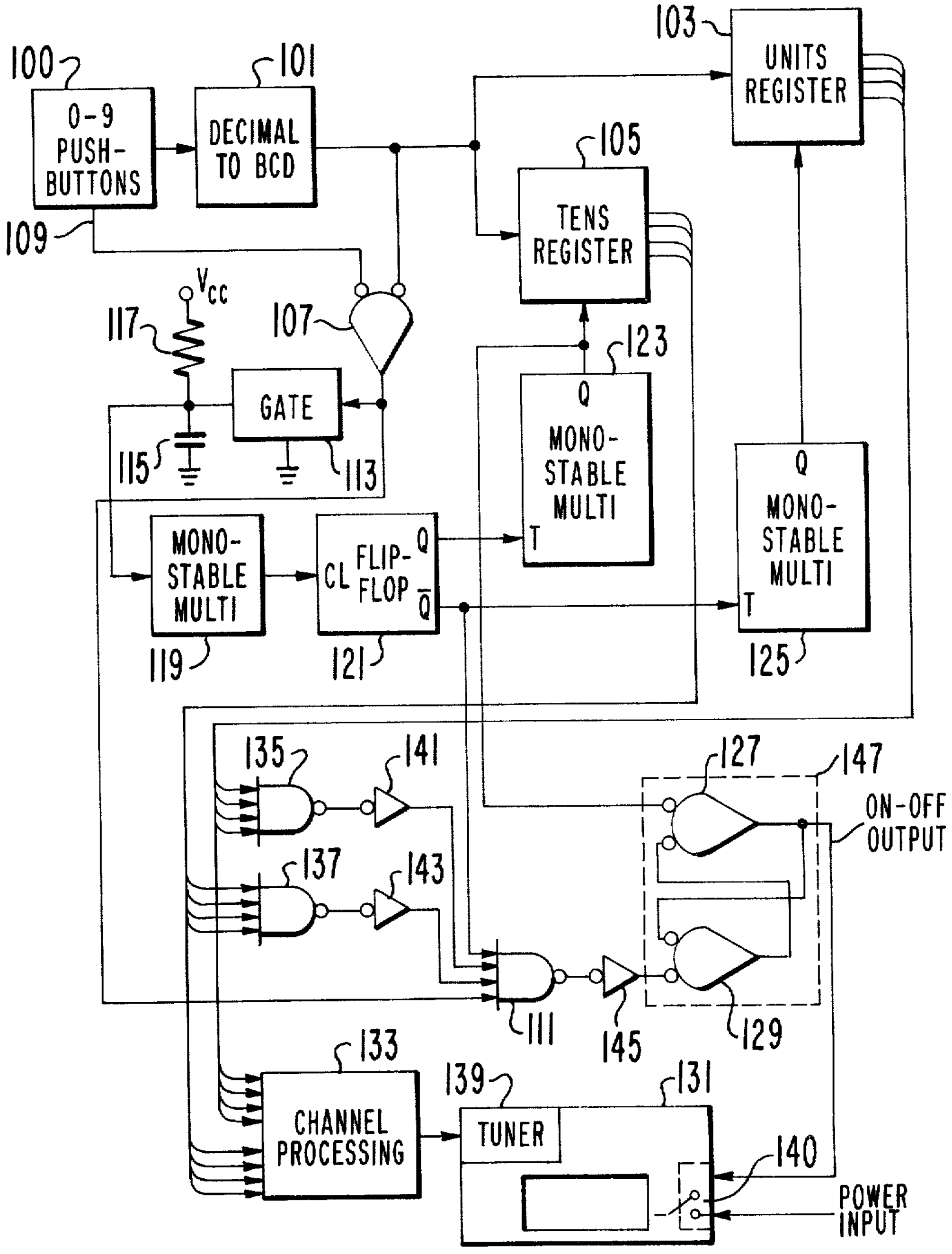

This invention relates to television receivers and more particularly to a system for turning a television receiver on or off without the aid of a conventional manually operated on-off switch.

In a television receiver, for example, of the type used in the United States, there are 82 available television channels. It is desirable to be able to select any one of these channels with equal ease, that is, to have a tuning system in which each channel may be addressed by the same process. In one type of channel selection system which provides parity of channel address, a series of 10 push buttons, or similar input devices, numerically representing digits 0 through 9, is incorporated for selecting a desired channel. Channel selection is then effected by sequentially depressing the push buttons representing the desired channel number. A first push button depression represents the tens digit of the channel number, for example, 0 if the desired channel number is 2 through 9, and 1 through 8 if the desired channel number is 10 through 83. A second push button depression represents the units digit of the desired channel number. The two selected digits are entered into storage (memory) registers wherein a numerical value is utilized to operate circuitry within the television receiver to place the tuner at the desired channel frequency. One particular problem that arises from tuner control systems that incorporate memory devices for storing the selected channel number is that upon turn-on of the television receiver, the memory, and hence the associated channel frequency tuner, responds to a random or previously entered channel number which may be unrelated to the desired channel. To remedy this problem, a power turn-on switching system may be incorporated with the channel selection apparatus to provide concurrent turn-on and channel selection of the receiver. If such a turn-on scheme is incorporated in a television receiver, it is also desirable to incorporate the receiver turn-off system in the same or common apparatus.

In accordance with the present invention, a television receiver having channel selection apparatus for selectively conditioning the receiver for reception of television signals on one of a plurality of numbered channels incorporates a system for coupling operating power to and removing operating power from a major portion of the television receiver comprising detecting means for determining the presence of signals from the channel selection apparatus. Means are coupled to the detecting means for providing a signal in response to initiation of a first digit of a selected channel number. A bistable means responsive to signals from the last-named means is set in a first state representative of an on condition. A register means is utilized for storing signals representative of first and second digits of a selected channel number. A switching means provides a signal in response to initiation of the second digit of the selected channel number. A gating means responsive to the simultaneous presence of predetermined first and second digit representative signals in the register means and a signal from the switching means sets the bistable means to a second state representative of an off condition. The on-off conditions of the bistable means are utilized to effect an on-off state in the application of power to the major portion of the associated television receiver.

The various aspects of the invention will be described below in greater detail referring to the accompanying drawing in which:

FIG. 1 is a partial block and schematic drawing of apparatus for turning a television receiver on and off in accordance with the invention.

With reference to FIG. 1, a channel selection apparatus including 10 touch or push button switches 100 (labelled 0 through 9) has buttons 1 through 9 coupled to a decimal to binary coded decimal (BCD) converter 101. The push button assembly 100 may be of a type commonly employed in small electronic calculators. The output of converter 101 is coupled to inputs on a units register 103, a tens register 105 and a NOR gate 107. A separate line 109 from assembly 100 couples a zero digit output directly to an input on NOR gate 107. NOR gate 107 and following apparatus serves as a detecting means for determining the presence of channel representative information supplied by a viewer by means of the channel selection switches 100. An output from NOR gate 107 is coupled to an input of a transfer gate 113 and NAND gate 111. Transfer gate 113 has an output terminal coupled to the common junction of a resistance-capacitance timing circuit comprised of the series combination of resistor 117 and capacitor 115 and maintains capacitor 115 discharged in the absence of enabling signals. The enabling signals are produced in response to depression of a button of assembly 100. A monostable multivibrator 119 is coupled to, and receives such enabling signals from the junction of resistor 117 and capacitor 115. An output from monostable multivibrator 119 is coupled to the clock input of a flip-flop (switching means) 121. Flip-flop 121 is a bistable switch arranged to provide bilevel output signals of logical ones or zeros at complementary output terminals Q and $\overline{Q}$. The Q and $\overline{Q}$ output terminals of flip-flop 121 are respectively coupled to input terminals (T) of monostable multivibrators 123 and 125. Respective output signals from monostable multivibrators 123 and 125 are coupled to storage enabling terminals of respective registers 105 and 103.

A bistable circuit 147 comprised of cross-coupled NOR gates 127 and 129 is coupled to a power switch 140. Power switch 140 is responsive to signals from bistable circuit 147 and operatively provides coupling of power to the major portion of television receiver 131. An output from monostable multivibrator 123 is coupled to an input of NOR gate 127 for providing signals to switch the output state of this NOR gate and hence, the output of bistable circuit 147 to a first state representative of an on condition.

Output signals from registers 103 and 105 are respectively coupled to NAND gates 135 and 137 and to channel processing circuit 133. Signals provided by channel processing circuit 133 are coupled to tuner 139 of television receiver 131 for providing appropriate channel-tuning information in a manner described, for example, in a co-pending U.S. patent application entitled, TELEVISION TUNING SYSTEM, Ser. No. 434,383, filed Jan. 18, 1974, of Wayne Wheeler Evans. The signals provided by NAND gates 135 and 137 are respectively coupled to inverters 141 and 143 wherein signal inversion is provided. Input terminals of NAND gate 111 are further coupled to respective output terminals of inverters 141 and 143 and the $\overline{Q}$ output terminal of flip-flop 121. Signals provided by NAND gate 111 are coupled to an input of NOR gate 129 through an inverter 145 for operatively causing the output of NOR gate 127 (the output of bistable circuit 147) to assume a second state representative of an off condition.

In the operation of the apparatus illustrated in FIG. 1, the main portion of the television receiver included within block 131 is not supplied with operating power until such time as the remainder of the apparatus illustrated provides an appropriate signal to indicate that a viewer has commenced selecting a desired channel. The channel selection and associated logic apparatus is provided with standby power to permit it to respond to such viewer selection. Typically, this apparatus consumes a very small amount of power and may be allowed to be activated continuously. However, if desired, a master power on-off switch (not illustrated) may be provided in much the same manner as is provided with current remote control television receivers of a conventional type. In the system operation, a switch in assembly 100, representative of the tens digit of a desired television channel, is depressed by the viewer. Although assembly 100 is referred to as having push button switches, other type devices which provide contact closure or electrical circuit closure may be used. As indicated above, if the desired channel is any one of channels 2 through 9, the zero button is depressed. If the desired channel is any one of those in the range of channels 10 through 83, a corresponding tens digit of 1 through 8 is depressed. Depression of one of the buttons of assembly 100 produces a signal either on one of nine lines (shown diagrammatically as a single line) at the output of assembly 100, which signal is coupled to decimal to BCD converter 101, or, if the digit is zero, on the 10th line 109 which is coupled directly to NOR gate 107. Converter 101 converts the signal derived from button assembly 100 into a binary coded decimal (BCD) number and transfers it via four lines (shown as a single line) to input terminals on tens register 105, units register 103 and NOR gate 107. When the buttons of assembly 100 are not depressed or if only the zero digit button is depressed, converter 101 provides a BCD zero on its four associated output lines. Logic circuitry, which will be discussed below, effects storage of the tens digit BCD signals in tens register 105.

To complete the channel selection command, a units digit 0 through 9 is selected. The selected button of assembly 100 is depressed, providing a signal on the appropriate one of the 10 associated output lines. If the number is any of the numbers 1 through 9, converter 101 converts the signal from button assembly 100 to a BCD number. In the absence of signals from assembly 100 or upon depression of the zero digit button, converter 101 provides a BCD zero. The BCD number provided by converter 101 is stored in units register 103. As will be pointed out below, such numbers preferably are stored in inverted form (i.e., zeros are substituted for ones and vice versa).

Signals provided to NOR gate 107 through either converter 101 or line 109 initiate an output signal from this gate to an input of gate 113. Gate 113, in the absence of input signals, provides a short circuit across capacitor 115. Upon receipt of an input signal, gate 113 opens allowing capacitor 115 to charge towards a supply voltage $V_{cc}$ through resistor 117. When the voltage across capacitor 115 reaches a predetermined level, for example, $V_{cc}/2$, it causes monostable multivibrator 119 to initiate an output pulse. The time constant of resistor 117 and capacitor 115 is selected to be about 50 milliseconds. The output pulse provided by multivibrator 119 is also of about 50 milliseconds duration and is of sufficient duration to cause flip-flop 121 to toggle and change output states. Flip-flop 121 is arranged such that upon initial application of power to the logic circuits (e.g., by means of a master on-off switch), the voltage level provided at the Q output terminal corresponds to a logical zero and conversely the voltage provided at the Q output terminal corresponds to a logical one. Hence, upon depression of a first button of assembly 100 representative of the tens digit of a selected television channel, the above delineated sequence of events occurs causing the Q output of flip-flop 121 to toggle into a first state from a logical zero to a logical one. Upon application of a logical one to an input terminal of monostable multivibrator 123, an output pulse of about 200 microseconds is produced at an associated output terminal. The 200 microsecond output pulse from multivibrator 123 enables the BCD signals provided by converter 101 to be stored in register 105 and further toggles the bistable circuit formed by NOR gates 127 and 129 to an on state. An on state signal from NOR gate 127 causes closure of power switch 140 within television receiver 131 applying power to the heretofore unpowered circuits in the receiver. Power switch 140 may be an electromechanical switch such as a relay or any other type of electrically activated switch known in the art. A second depression of a button of assembly 100 causes flip-flop 121 to toggle into a second state causing the $\overline{Q}$ output to assume a logical one position and thereby trigger monostable multivibrator 125. Multivibrator 125, in a similar fashion to that of multivibrator 123, provides a 200 microsecond output pulse enabling storage of the BCD signals provided by converter 101 in units register 103.

Thus, by providing power to a relatively small logic circuit apparatus which is auxiliary to a main portion of a television receiver (the apparatus illustrated in FIG. 1 with the exception of television receiver 131), a desired television channel may be selected simultaneously with the turning on of power to the larger power consuming portion of the television receiver. Since the power to the receiver is turned on without the aid of a manual on-off power switch, an off function may similarly be provided.

An off function can be provided without the aid of a manual power on-off switch by utilizing channel selection of a non-existent television channel to initiate an off mode, for example, selection of channel 00 can be decoded as an off condition and programmed to remove power from the remainder of the television receiver. Upon sequential entry of first and second zero representative digits in respective tens and units registers 105 and 103, BCD zero-representative signals are applied to respective inputs of NAND gates 137 and 135. BCD signals stored in the tens and units registers are in inverted format; that is, a BCD number has its zeros replaced by ones and ones replaced by zeros so that the number zero, which normally has a BCD representation of four zeros, is represented by four ones. Application of logical ones to all of the inputs of a NAND gate provides a logical zero at the output terminal of this gate. Hence, the application of logical ones (representative of a zero digit) to respective inputs of NAND gates 137 and 135 provide logical zero output signals at their respective output terminals. Logical zeros provided by NAND gates 137 and 135 are inverted by respective inverters 143 and 141 to provide logical one signals. The logical one signals provided by inverters 143 and 141 are coupled to input terminals of NAND gate 111. NAND gate 111 has four input terminals, two of which are respectively coupled to inverters 143 and 141, and two of which are respectively coupled to an output of NOR gate 107 and the $\overline{Q}$ output terminal of flip-flop 121. In order to provide an appropriate signal to toggle bistable circuit 147 to an off state, it is necessary to first provide a logical zero output signal from NAND gate 111. NAND gate 111 provides a logical zero output when zero representative BCD signals are stored in registers 103 and 105, flip-flop 121 is in a second state (a logical one is provided at the $\overline{Q}$ terminal) and the depressed zero digit push button of assembly 100 is released. Depression of a push button of assembly 100 provides a logical one to an input of NOR gate 107 causing the signal provided at the output terminal of this gate to be a logical zero. Release of a depressed push button therefore provides a logical one at the output of NOR gate 107. Logical zero output signals from gate 111 are provided after release of the zero digit push button in order to allow sufficient time for registers 103 and 105, and flip-flop 121 to stabilize. The logical zero provided by NAND gate 111 is inverted by inverter 145 to provide a logical one. This logical one signal provided by inverter 145 is coupled to an input of NOR gate 129 (part of bistable circuit 147) causing the output of this NOR gate to change state from a logical one to a logical zero, in turn causing the output of NOR gate 127 to change state from a logical zero to a logical one. The logical one provided by NOR gate 127, and hence bistable circuit 147 causes power switch 140 to open and thereby remove power from the major portion of television receiver 131. An inadvertent off condition which might have occurred when a previously selected television channel has a zero units digit (e.g., channels 10, 20, 30, etc.), and the currently selected channel has a zero tens digit (e.g., channels 02, 03, etc.) is avoided by coupling the $\overline{Q}$ output terminal of flip-flop 121 to an input terminal of NAND gate 111. The zero units digit from such a previously selected channel, together with a tens digit zero from a currently selected channel command, in the absence of inhibiting signals from flip-flop 121, would operate to provide a logical zero output signal from gate 111 and hence, turn off television receiver 131. This inadvertent off condition, as mentioned above, is avoided by coupling the $\overline{Q}$ output terminal of flip-flop 121 to NAND gate 111 insuring thereby that an output (logical zero) from NAND gate 111 is not provided until after entry of a second zero digit.

Thus, through the use of channel selection signals provided by assembly 100, television receiver 131 may be switched to an on condition while concurrently selecting a desired television channel and to an off condition by selection of a predetermined number which does not correspond to any existent television channel number, such as a channel 00.

What is claimed is:

1. In a television receiver having channel selection apparatus for selectively conditioning said receiver for reception of signals on one of a plurality of numbered channels, a system for coupling operating power to and removing operating power from a major portion of said television receiver comprising:

detecting means for determining the presence of channel number representative signals supplied from said channel selection apparatus;

means coupled to said detecting means for providing a first signal in response to entry at said channel selection apparatus of a first digit of a selected channel number;

bistable means responsive to signals from said last-named means for setting said bistable means in a first state representative of a power on condition;

register means coupled to said channel selection apparatus for storing signals representative of at least first and second digits of a selected channel number;

switching means for providing a signal in response to entry at said channel selection apparatus of said second digit of said selected channel number; and gating means responsive to the simultaneous presence of predetermined first and second digit representative signals in said register means and said signal from said switching means for setting said bistable means in a second state representative of a power off condition.

2. Apparatus according to claim 1 wherein said detecting means comprises a logic gate arranged for receiving channel number representative signals from said channel selection apparatus and for providing an output signal in response to said received signals.

3. Apparatus according to claim 2 wherein said bistable means is set in a first state by a pulse provided by said means for providing a first signal in response to entry of a first channel number digit from said channel selection apparatus.

4. The apparatus of claim 3 including a power switching means operatively responsive to signals from said bistable means for coupling power to the major portion of said television receiver.

5. Apparatus according to claim 4 wherein said bistable means comprises second and third gates each having input and output terminals, said output terminal of said second gate coupled to an input of said third gate and said output of said third gate coupled to an input terminal of said second gate for providing a circuit having a bistable output.

6. Apparatus according to claim 1 wherein said gating means comprises a gate having input terminals for receiving signals from said switching means and signals representative of first and second digits of a selected channel, said gate providing an output signal when said first and second digits correspond to a predetermined number which does not correspond to an existent channel number.

7. Apparatus according to claim 6 wherein said switching means comprises a bistable switch having an input terminal for receiving signals and an output terminal for providing alternate bilevel signals in response to said input signals, said bilevel signals corresponding to logical ones and zeros.

8. Apparatus according to claim 7 wherein said switching means is arranged to provide a logical zero output signal upon initial energization of said switching means.

9. Apparatus according to claim 8 wherein said predetermined first and second digit representative signals provided to input terminals of said gating means corresponds to the number 00.

10. In a television receiver having channel selection apparatus for selectively conditioning said receiver for reception of signals on one of a plurality of numbered channels, a system for coupling operating power to and removing operating power from a major portion of said television receiver comprising:

bistable means having an input terminal for receiving signals and an output terminal for providing signals in first and second states, said first state corresponding to a receiver power on condition and said second state corresponding to a receiver power off condition;

register means for storing signals representative of first and second digits of a selected channel number;

switching means for providing a signal in response to entry at said channel selection apparatus of said second digit of said selected channel number; and gating means responsive to the simultaneous presence of predetermined first and second digit representative signals in said register means and said signal from said switching means for setting said bistable means in a second state representative of an off condition.

11. Apparatus according to claim 10 wherein said gating means comprises a gate having input terminals for receiving signals from said switching means and signals representative of first and second digits of a selected channel, said gate providing an output signal when said first and second digits correspond to a predetermined number which does not correspond to an existent channel number.

12. Apparatus according to claim 11 wherein said switching means comprises a bistable switch having an input terminal for receiving signals and an output terminal for providing alternate bilevel signals in response to said input signals, said bilevel signals corresponding to logical ones and zeros.

13. The apparatus of claim 12 including a power switching means operatively responsive to signals from said bistable means for coupling power to the major portion of said television receiver.

14. Apparatus according to claim 13 wherein said predetermined first and second digit representative signals provided to input terminals of said gating means corresponds to the number 00.

15. In a television receiver having channel selection apparatus for selectively conditioning said receiver for reception of signals on one of a plurality of numbered channels, a system for coupling power to a major portion of said television receiver comprising:

detecting means for determining the presence of channel number representative signals supplied from said channel selection apparatus;

means coupled to said detecting means for providing a first signal in response to entry at said channel selection apparatus of a first digit of a selected channel number;

bistable means responsive to signals from said last-named means for setting said bistable means in a first state; and power switching means responsive to said first state condition, for coupling power to the major portion of said television receiver.

16. Apparatus according to claim 15 wherein said detecting means comprises a logic gate arranged for receiving channel number representative signals from said channel selection apparatus and for providing an output signal in response to said received signals.

17. Apparatus according to claim 16 wherein said bistable means is set in a first state by a pulse provided by said means for providing a first signal in response to entry of a first channel number digit from said channel selection apparatus.

* * * * *